(12) United States Patent
Kappel et al.

(10) Patent No.: US 11,579,351 B2
(45) Date of Patent: Feb. 14, 2023

(54) SIDE-EMITTING LIGHT GUIDE AND METHOD FOR THE PRODUCTION THEREOF

(71) Applicant: SCHOTT AG, Mainz (DE)

(72) Inventors: Markus Kappel, Roxheim (DE); Lothar Willmes, Oestrich-Winkel (DE); Hubertus Russert, Jugenheim (DE); Bernd Hoppe, Ingelheim (DE)

(73) Assignee: SCHOTT AG, Mainz (DE)

( * ) Notice: Subject to any disclaimer, the term of this patent is extended or adjusted under 35 U.S.C. 154(b) by 0 days.

(21) Appl. No.: 17/013,250

(22) Filed: Sep. 4, 2020

(65) Prior Publication Data
US 2021/0063624 A1    Mar. 4, 2021

(30) Foreign Application Priority Data
Sep. 4, 2019 (DE) ..................... 10 2019 123 694.0

(51) Int. Cl.
*F21V 8/00* (2006.01)
*G02B 6/04* (2006.01)

(52) U.S. Cl.
CPC ............... *G02B 6/001* (2013.01); *G02B 6/04* (2013.01)

(58) Field of Classification Search
CPC ............ G02B 6/001; G02B 6/04; G02B 6/06
See application file for complete search history.

(56) References Cited

U.S. PATENT DOCUMENTS

| | | | |
|---|---|---|---|
| 4,763,984 A | 8/1988 | Awai | |
| 5,333,234 A | 7/1994 | Hashimoto | |
| 5,485,541 A | 1/1996 | Bigley | |
| 5,684,904 A * | 11/1997 | Bringuier | G02B 6/441 385/112 |
| 5,695,583 A | 12/1997 | van den Bergh | |
| RE36,157 E | 3/1999 | Robbins | |
| 6,169,836 B1 | 1/2001 | Sugiyama | |

(Continued)

FOREIGN PATENT DOCUMENTS

| | | |
|---|---|---|
| DE | 102008009139 | 8/2009 |
| DE | 102009039556 | 3/2010 |

(Continued)

OTHER PUBLICATIONS

EN ISO 10993-1, "Biological evaluation of medical devices—Part 1: Evaluation and testing within a risk management process", Aug. 2018, 48 pages.

(Continued)

*Primary Examiner* — Evan P Dzierzynski
(74) *Attorney, Agent, or Firm* — Ruggiero McAllister & McMahon LLC (57) ABSTRACT

A flexible light guide that has a homogeneous light emission with high luminance is provided. The flexible light guide is provided by a side-emitting light guide. The side-emitting light guide includes a light-guiding fiber designed as a side-emitting fiber so that light guided in the fiber is scattered out along a longitudinal direction in a distributed manner. The guide also includes a tube that surrounds the fiber. The tube is designed to be light-scattering and translucent so that light emitted from the fiber can traverse the tube with scattering. The tube is surrounded by a cladding. The tube and cladding are made of plastic.

24 Claims, 7 Drawing Sheets

(56) References Cited

U.S. PATENT DOCUMENTS

| | | | |
|---|---|---|---|
| 6,519,401 B1* | 2/2003 | Imamura | B29C 48/05 |
| | | | 362/558 |
| 2003/0185530 A1 | 10/2003 | White | |
| 2005/0213907 A1 | 9/2005 | Hiroishi | |
| 2007/0189031 A1* | 8/2007 | Delmar | G02B 6/0008 |
| | | | 362/556 |
| 2008/0025039 A1* | 1/2008 | Guillermo | B60Q 1/2676 |
| | | | 362/556 |
| 2008/0061457 A1 | 3/2008 | Walker | |
| 2011/0002589 A1 | 1/2011 | Ho | |
| 2011/0103757 A1 | 5/2011 | Alkemper | |
| 2012/0170305 A1 | 7/2012 | Rudek | |
| 2013/0195410 A1 | 8/2013 | Karbasivalashani | |
| 2013/0314940 A1 | 11/2013 | Russert | |
| 2014/0218958 A1 | 8/2014 | Fewkes | |
| 2015/0049994 A1 | 2/2015 | Schultheis | |
| 2015/0131955 A1 | 5/2015 | Bennett | |
| 2016/0038621 A1 | 2/2016 | Victor | |
| 2016/0101263 A1 | 4/2016 | Blumenkranz | |
| 2016/0313486 A1 | 10/2016 | Woelfing | |
| 2016/0320556 A1 | 11/2016 | Nasilowski | |
| 2016/0341612 A1 | 11/2016 | Bals | |
| 2017/0184772 A1* | 6/2017 | Dykaar | G02B 5/0221 |
| 2017/0312117 A1* | 11/2017 | Shah | A61B 5/682 |
| 2018/0120267 A1 | 5/2018 | Wang | |
| 2018/0369432 A1 | 12/2018 | Zaborsky | |
| 2020/0222712 A1 | 7/2020 | Schultheis | |

FOREIGN PATENT DOCUMENTS

| | | |
|---|---|---|
| DE | 102012208810 | 11/2013 |
| DE | 202017107616 | 1/2018 |
| DE | 102017122 | 4/2019 |
| DE | 102017129978 | 6/2019 |
| EP | 3086027 | 10/2016 |
| EP | 3096077 | 11/2016 |
| JP | H05341125 | 12/1993 |
| JP | H0675118 | 3/1994 |
| JP | H06331830 | 12/1994 |

OTHER PUBLICATIONS

ISO 11135, "Sterilization of health-care products—Ethylene oxide—Requirements for the development, Validation and routine control of a sterilization process for medical devices", Jul. 15, 2014, 88 pages.

* cited by examiner

SIDE-EMITTING LIGHT GUIDE AND METHOD FOR THE PRODUCTION THEREOF

CROSS REFERENCE TO RELATED APPLICATIONS

This application claims benefit under 35 USC § 119 of German application 10 2019 123 694.0 filed Sep. 4, 2019, the entire contents of which are incorporated herein by reference.

BACKGROUND

1. Field of the Invention

The invention relates to the technical field of light-emitting elements in general. In particular, the invention relates to the use of light guides in lighting devices or display devices.

2. Description of Related Art

For lighting or display purposes, it may be desirable to utilize linear light sources. A light emitter having a side-emitting light guide coupled thereto can serve as such a light source. In terms of a space-saving construction and also a high robustness, among other things, such an arrangement is superior to an arrangement composed of many small, adjacently arranged emitters, such as, for instance, an LED chain. Thus, in the case of such a chain, the high number of components can rapidly result in the failure of individual light diodes, which is perceived immediately as disturbing to the eye.

Side-emitting light guides offer another possibility for the creation of linear light sources. In these light guides, light emitters are connected at one end or at both ends and couple light into the light guide. Distributed in the light guide are scattering elements, which disseminate the light that is guided in the light guide. These light sources create a very homogeneous illumination. Of course, the total luminous flux is limited by the intensity provided by the light emitter.

Even when the light guide shines homogeneously to the eye, a problem can arise when the light guide is bent. If the light guide is bent when it is fastened by clips on a subsurface, for example, the scattering cladding, which lies only loosely on the core, can detach or is stretched and thereby becomes thinner by bending at the outer region and is compressed in the interior of the bend, so that wrinkles can form. In the process, air gaps can form between the scattering cladding and the light-guiding core and can also remain there during realignment. These air gaps then lead to a locally varying decoupling of the light and thereby to an inhomogeneous luminous intensity.

The invention is consequently based on the object of providing a light source with a linear impression, which has a flexible light guide that has a homogeneous light emission with high luminance.

A light source with linear impression is understood to mean a light source that, to the naked eye of an observer at a normal viewing distance, appears as a shining line without appreciable transverse expansion. This line does need not to be straight, but rather, in particular, can also have a curved shape. Accordingly, the invention provides a side-emitting light guide, comprising at least one light-guiding fiber designed as a side-emitting fiber, so that light that is guided in the fiber is scattered out along the longitudinal direction in a distributed manner, as well as a tube that surrounds the fiber, wherein the tube is designed to be translucent and preferably light-scattering, so that the light emitted from the fiber can traverse the tube with scattering, wherein the tube is surrounded by a transparent cladding. In this case, the tube and the cladding are made of plastic.

Preferably, not only a single light-guiding fiber, but a bundle of fibers containing a plurality of light-guiding fibers is carried in the tube. The separation into a plurality of fibers is favorable in order to keep the light guide as flexible as possible.

For the flexibility of the light guide, moreover, it is especially preferred that the at least one $_{fiber}$ or the fiber bundle is guided loosely in the tube 3. Accordingly, there exists no connection between the tube and the adjacent fiber or fibers. In this way, the fibers can move within the tube, in particular in the longitudinal direction, thereby facilitating the bending and preventing stresses from being created on the fibers during the bending.

Arranged in the interior of the tube is therefore at least one fiber and preferably a plurality of light-guiding fibers in the form of a fiber bundle, in which the fibers are each designed to be side-emitting, so that light coupled into the respective fibers is gradually scattered out along the longitudinal extension of the light guide, passes through the tube with further scattering, and is emitted through the cladding toward the outside. Thus, the light guide also has an at least two-shell structure, composed of the outer, transparent cladding and the tube that forms an inner cladding. Since the tube is light-scattering, the angular distribution of the light emitted from the fibers is further homogenized, so that, in a preferred embodiment, in an angular range of +45° to −45° in each spatial direction, the deviation of the emission intensity in comparison to 0° (perpendicular) is less than 55%, more preferably less than 30%, and especially more preferred less than 20%. This is above all applicable, even in bent portions of the light guide according to the invention.

The light guide can be produced by use of a method in which at least one light-guiding, side-emitting fiber is arranged in a plastic tube that is designed to be light-scattering and translucent, whereby the tube with the at least one light-guiding fiber contained in it is then surrounded by transparent cladding made of plastic.

The light guide described here also enables circumventing the problem of a formation of air gaps after a bending. Even when the local formation of an air gap occurs between the cladding and the tube, this air gap no longer influences the decoupling of the light and thus the local scattering efficiency, because the scattering and decoupling of the light already occur in the interior of the tube in the individual light-guiding fibers.

BRIEF DESCRIPTION OF THE DRAWINGS

The invention will be described in detail below on the basis of figures.

DETAILED DESCRIPTION

Figures 1, 2, 3, 4:
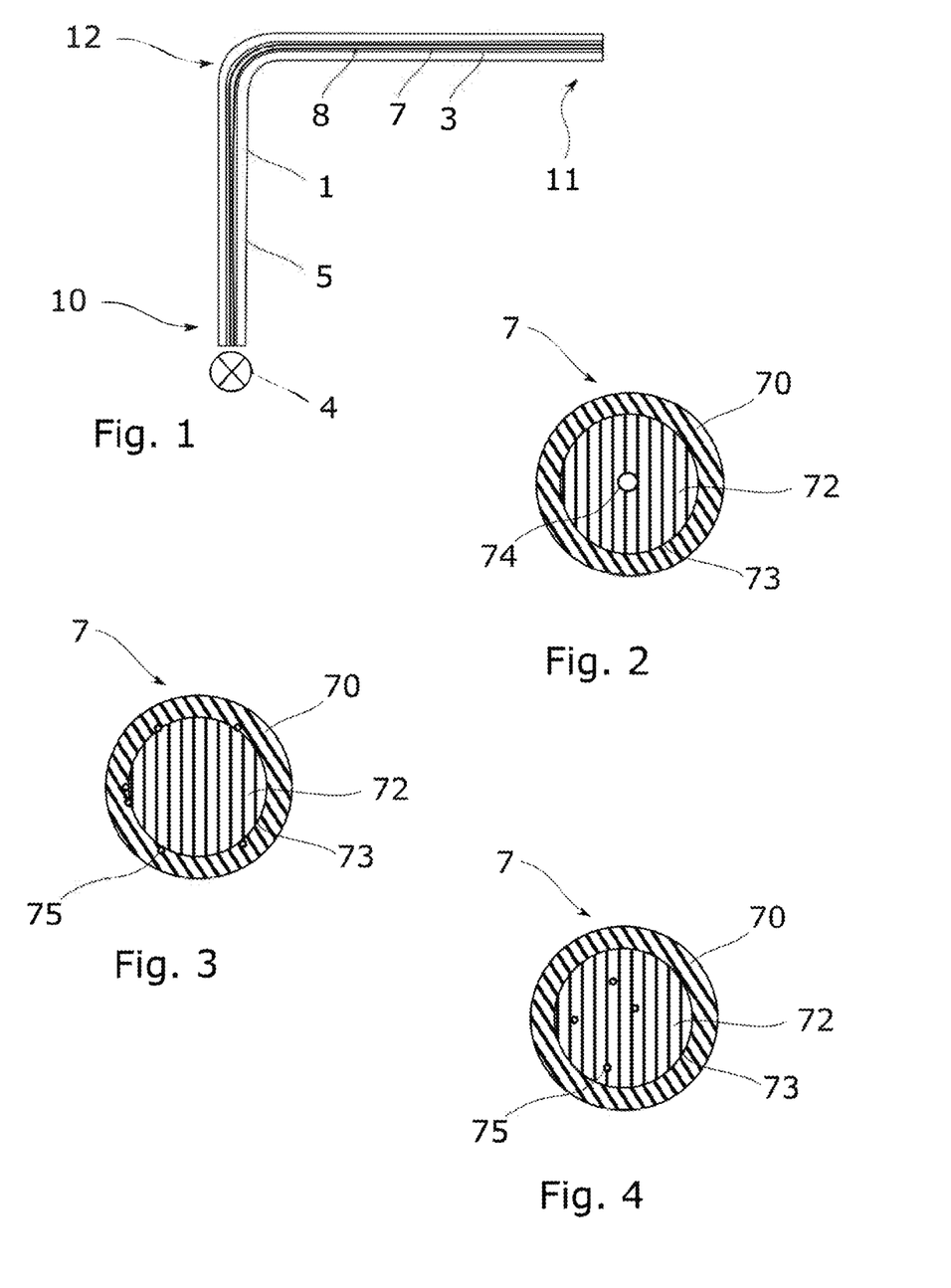
FIG. 1 shows a light source with a side-emitting light guide.
FIGS. 2-4 are cross-sectional views through side-emitting fibers.

In FIG. 1, a light source 2 with a side-emitting light guide 1 in accordance with this disclosure is illustrated schematically. The light source 2 comprises a light emitter 4, which is optically coupled at one end 10 of the light guide 1 to at least one light-guiding fiber 7, preferably to the light-guiding fibers 7 of a fiber bundle 8, in order to couple light into the one fiber or the plurality of fibers 7. In general, without any limitation to the illustrated exemplary embodiment, semiconductor light emitters are preferred for the light source 2. They can comprise light-emitting diodes or semiconductor lasers. In this way, it is also possible to couple a plurality of light emitters of different colors in order to obtain an illumination having an adjustable light color. In contrast to what is illustrated in FIG. 1, it is also possible to arrange light emitters 4 at both ends 10, 11 of the light guide 1 in order to couple their light into the fibers 7.

In general, the fiber bundle 8 extends in a tube 3, which, in turn, is surrounded by a cladding 5. Both the tube 3 and the cladding 5 are made of plastic. This gives the light guide 1 a high flexibility, so that it can be put in place and fixed in position in a simple way. In the illustrated example, by way of example, the light guide 1 has been provided with a bend 12 having a 90° turn.

Typically, a side-emitting light guide differs from light guides for data transmission in having a shorter provided length, because the luminance declines with increasing length for a given brightness of the coupled light emitter. For this purpose, without any limitation to specific embodiments, it is provided in a further development of the invention that the light guide 1 has a length in the range of 0.5 meter up to 100 meters, preferably up to 50 meters. Long lengths are suitable, in particular in connection with lasers as light emitters. For decorative lightings and other applications of lighting technology, shorter lengths of up to 105 meters, preferably 2.5 to 5 meters, are especially suitable. In the field of medicine, as components for single or multiple use in devices for diagnostic and therapeutic treatments, among other things, lengths of less than 0.5 meter, preferably less than 0.1 meter, particularly preferred of 0.01 to 0.05 meter, are suitable for a preferred diameter of the light guide 1 here of approximately 1 mm and thinner.

FIG. 2 shows an embodiment of a light-guiding, side-emitting fiber 7 in cross-sectional view. A fiber bundle 8 for the light guide can then be produced by combining a plurality of such fibers 7. Without any limitation to the illustrated example, the fiber 7 comprises, in general, a fiber core 72, which is surrounded by a fiber sheath 70, whereby the fiber core 72 exhibits a higher index of refraction than the fiber sheath 70, so that light in the fiber core 72 can be guided in the conventional way with total reflection at the interface 73 to the fiber sheath 70. In the fiber core 72, a light-scattering soul ("soul") 74 extends in the longitudinal direction of the light-guiding fiber 7. It partially scatters light that is guided in the fiber core 72 so that the light can exit from the fiber 7. In this way, light is scattered out continuously along the fiber 7.

FIG. 3 shows an example of another embodiment of a light-guiding fiber 7. Just like the fiber in accordance with FIG. 3, the fiber 7 has a fiber core 72, which is surrounded by a fiber sheath 70 with a lower index of refraction. This embodiment is based on the fact that, at the interface 73 between the fiber core 72 and the fiber sheath 70, light-scattering elements 75 are present. Through scattering, they alter the direction of the light that is otherwise reflected at the interface 73, so that the light is partially scattered out. In general, the light-scattering elements can also be present in the fiber sheath 70. In particular, the light-scattering elements situated near to or at the interface then cause the light to be scattered out.

FIG. 4 is another embodiment in which light-scattering elements 75 are distributed in the fiber core 72. In general, the light-guiding fibers 7 in accordance with one embodiment also have a fiber core 72 and a fiber sheath 70, which has a lower index of refraction than the fiber core 72, whereby at least one light-scattering element 74, 75 in the fiber 7 is arranged in such a way that it gradually scatters out light that is guided in the fiber core 72 in the longitudinal direction of the fiber 7. In the case of FIG. 2, a single light-scattering element is provided in the form of a soul 74 that extends in the longitudinal direction of the fiber 7. However, it is also possible for a plurality of souls 74 to be present. All of the illustrated exemplary embodiments can also be combined with one another. Thus, the embodiment in accordance with FIG. 2 can also have additional light-scattering elements 75 at the interface 73 or in the fiber core 72. The at least one fiber 7 can be fabricated from glass or else from plastic. Preferably, the light-guiding fibers 7 are side-emitting glass fibers. This embodiment is advantageous, because the high transparency of the glasses is exploited over longer path lengths and, on account of the use of a fiber bundle containing a plurality of thin fibers, it is nonetheless possible to create a flexible light guide 1.

Figure 5:
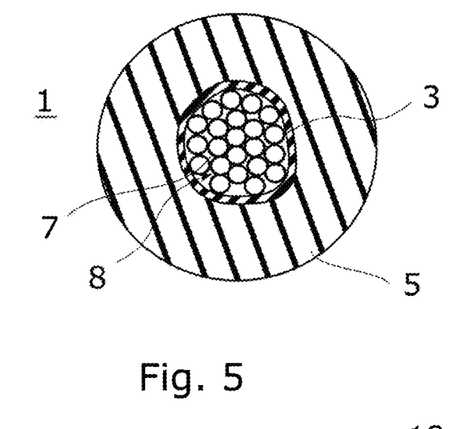
FIG. 5 shows cross-sectional views through a light guide.

FIG. 5 shows a side-emitting light guide 1 in cross-section. The light guide 1 comprises a fiber bundle 8 containing a plurality of light-guiding, side-emitting fibers 7, which scatter out the light along the longitudinal direction in a distributed manner from the fibers 7 and thereby also from the light guide 1, so that a thin, elongated or linear illumination is created. The fiber bundle 8 is surrounded by a tube 3. The tube is light-scattering and translucent. In this way, it is possible for light emitted from the fibers 7 of the fiber bundle 8 to traverse the tube 3, whereby, in general, the light is scattered at least partially in the wall of the tube 3. Furthermore, the tube 3 is surrounded by a transparent cladding 5. The tube 3 and the cladding 5 are made of plastic. A flexible light guide 1, which can be put in place and, in particular, can be bent, is thereby created.

In general, the tube 3 is preferably thin-walled in design. The diameter of the arrangement composed of the fiber bundle 8 and the tube 3 is thereby kept as small as possible. This is advantageous in order to achieve a high luminance. For this reason, the wall thickness of the tube and the diameter of the light guide 1 or of the cladding 5 should differ as markedly as possible. A large ratio of the outer diameter to the wall thickness of the tube 3 also reduces the given bending radii at the tube and in the fiber bundle 8 and, in this way, prevents any breakage of the fibers 7 in the fiber bundle 8 during bending, when the bending of the light guide 1 is too strong. For this purpose, without any limitation to the special illustrated example, it is provided in a further development that the tube 3 has a wall thickness that is less by at least a factor of five than the outer diameter of the transparent cladding 5. Furthermore, for this purpose, it is preferred that the diameter of the transparent cladding is at least 1 millimeter and preferably at least 2 millimeters in order to limit the bending radii in the fiber bundle 8.

In general, it is also preferred when the wall thickness of the tube 3 is at most 200 micrometers and, in particular, at most 100 micrometers. A high flexibility of the inner part of the light guide with the tube 3 and the fiber bundle 8 contained in it is thereby achieved. At the same time, a high luminance of the light guide and a homogeneous angular distribution of the side-emitted light is thereby achieved, in particular in interplay with the use of scattering particles with diameters that are smaller by more than a factor of 100 than the wall thickness of the tube 3, more preferably smaller by more than a factor of 150, especially more preferred smaller by more than a factor of 200. Since in general, scattering particles having a size distribution are involved, the diameter of the scattering particles refers to the mean value (also referred to as D50).

The ratio of the diameter of the cladding 5 to the diameter of the tube 3 is preferably at least 1.5/1 in order to achieve a high luminance for a given diameter of the light guide 1 and in order to prevent the bending radii of the fiber bundle 8 from being too tight. In contrast to what is shown in FIG. 5, the cladding 5 does not need to have a circular cross section. The same also holds true for the tube 3. In the illustrated example, the tube 3 already adapts itself to the shape of the fiber bundle 8 and its cross section is thereby not exactly circular. In such a case, the mean diameter of the cladding 5 and the tube 8 can be set to 1 for the ratio of 1.5 given above. However, it is equally possible to consider the cross-sectional areas. It is preferred here, in general, when the ratio of the cross-sectional area of the surface enclosed by the outer contour of the cladding 5 to the cross-sectional area enclosed by the outer contour of the tube 3 is at least 2.25/1. For a thin wall thickness of the tube 3, the cross-sectional area enclosed by the outer contour of the tube corresponds roughly to the cross-sectional area of the fiber bundle 8.

In accordance with a preferred embodiment, the fiber bundle 8 has a diameter in the range from 0.5 mm to 5 mm, preferably from 1 mm to 3 mm. Accordingly, for non-round geometries, the cross-sectional area of the fiber bundle is 0.19 mm$^2$ to 19.7 mm$^2$, preferably 0.78 mm$^2$ to 7.1 mm$^2$.

It has proven to be especially suitable in terms of both the optical properties and the mechanical properties of the light guide 1 when the tube 3 is designed as a plastic tube that is shrunk around the fiber bundle 8. By way of the shrinkage, it is possible to achieve a good adaptation of the shape of the tube 3 to the contour of the fiber bundle 8, without strongly compressing the fiber bundle 8. Moreover, such shrink tubing with a wall thickness of 30 μm and less is available and further increases the luminance of the light guide. If need be, the plastic tube can also be shrunk only partially or in sections around the fiber bundle. In general, it is favorable when the fibers 7 are combined in the tube 3 in a still loose manner or are carried in the tube 3 loosely without a material-bonding or form-fitting connection. In this way, tensile stresses on individual fibers 7 and, as a result, ensuing fiber breaks are prevented during bending of the light guide 1.

For the light-guiding fibers 7, diameters in the range from 10 to 250 μm, preferably from 20 μm to 100 μm, preferably from 30 μm to 70 μm, are suitable in order to achieve a good flexibility of the fiber bundle 8.

Suitable as material for the tube 3 is polyester, among other materials. In order to endow the tube 3 with light-scattering properties, it is possible for light-scattering particles to be contained in the plastic as an additive. In accordance with one embodiment, the plastic contains oxide particles. Especially suitable are highly refractive oxides, such as titanium oxide. Consequently, in one embodiment, a tube 3 in the form of a polyester tube is provided with oxide particles, in particular with titanium oxide particles. Up to more than 50% of the scattering particles thereby embedded in the tube 3 preferably have a diameter of less than 1 μm in order to increase the homogeneity of the emission.

As plastic for the cladding 5, a polymer blend has proven to be especially suitable. A polymer enables the properties of both a high transparency and a high flexibility to be united. As a component or as one of the polymers of the polymer blend, it is possible preferably to utilize an aliphatic polyurethane, which is especially elastic and can be combined with other plastics to create a highly transparent polymer blend. In particular, such an aliphatic polyurethane can also be a thermoplastic elastomer. Alternatively or additionally, as a component, another thermoplastic elastomer can be a constituent of the polymer blend. In accordance with another embodiment, it is accordingly provided that at least one of the polymers of the polymer blend forms a thermoplastic elastomer.

In another embodiment, one of the polymers of the polymer blend is a polycarbonate. Polycarbonates are advantageous in terms of the transparency of the cladding. The same holds true for PMMA. In accordance with yet another alternative or additional embodiment, therefore, it is provided that one of the polymers of the polymer blend is a polymethyl methacrylate.

An especially suitable combination is a polymer blend that, in general, contains polymethyl methacrylate and a thermoplastic polyurethane. These two components alone can form, in particular, the polymer blend or, when additional components are present, can be the two components with the two greatest proportions in the mixture of the blend.

It is provided in accordance with yet a further development that at least one of the plastics of the tube 3 and the cladding 5 contains polymer particles. These particles can further improve the mechanical properties. Thus, polymer particles are known as an additive for increasing the impact strength. A very transparent and, at the same time, impact-resistant and abrasion-resistant plastic, which is thus capable of resisting scratches, can be obtained in accordance with an advantageous further development when at least one the plastics of the cladding 5 and the tube 3 contains polymer particles with cross-linked PMMA. This embodiment is then suitable especially in combination with a polymer blend that contains PMMA. In accordance with yet a further development of the invention, therefore, a polymer blend is provided, which contains PMMA and additionally contains polymer particles with cross-linked PMMA as components.

It is also possible through the structure of a light guide 1 described herein, to utilize, alternatively or additionally to impact-strength modifiers, further additive substances that otherwise tend to be detrimental to the optical properties. In particular, it is conceived to utilize in the cladding 5 at least one additive substance that can be a flame retardant or a UV stabilizer. The optical properties of the light guide 1 are hardly influenced by these additive substances in the cladding 5, because the transmission in the light-guiding fibers is not disrupted and, after passing through the tube 3, the light traverses only a short path distance through the cladding 5.

Figure 6:
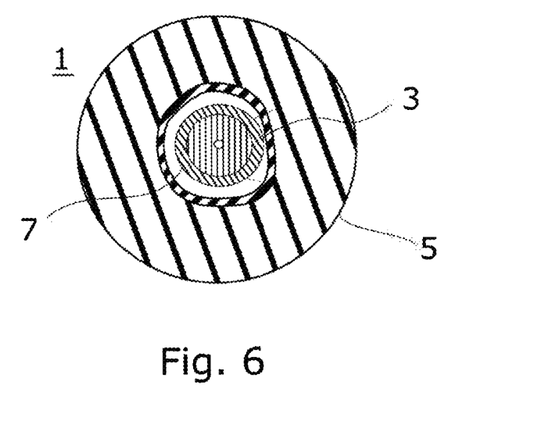
FIG. 6 is a variant with a single light-guiding fiber.

FIG. 6 shows a variant of the example of FIG. 5. Instead of a fiber bundle 8, this variant has a single side-emitting light-guiding fiber 7. As illustrated, in comparison to fibers of a fiber bundle, the fiber 7 can be thicker in order to in-couple as much light as possible. On the other hand, however, the cross section of the light guide 1 can also be smaller overall than for an embodiment with a fiber bundle. As illustrated, the individual fibers 7 can also be carried loosely in the tube 3 in general or not be joined to the tube 3 in order to facilitate the bending of the light guide 1 and also to prevent irreversible changes after a bending operation. In the illustrated example, the fiber corresponds to the structure in accordance with FIG. 2.

Figure 7:
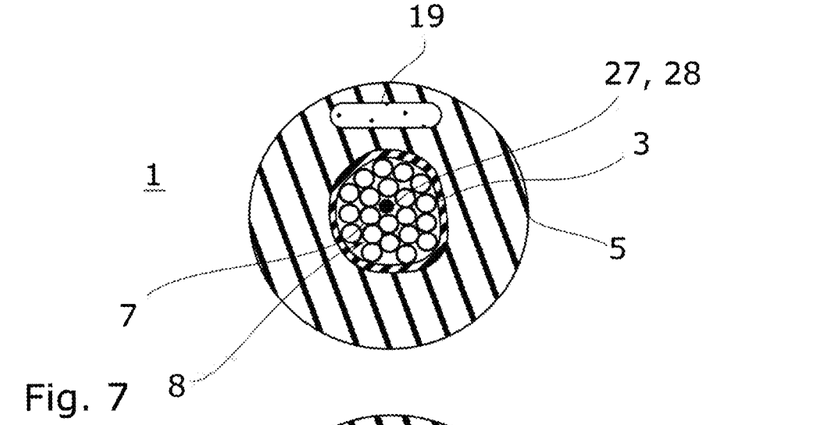
FIG. 7 is a variant of the example of FIG. 5 with an effect portion.

In one embodiment of the light guide 1, it is provided that the light guide 1 comprises an elongated optical effect portion 19, which is joined to the cladding 5 and, in particular, is recessed in the cladding 5 and which extends along the longitudinal direction of the light guide 1, the properties of which influence the light emitted from the tube 3 in terms of its color, brightness, or direction of emission. An example of this is shown in the variant of FIG. 7. In this example, an effect portion 19 is arranged in the cladding in the form of a diffusely reflecting strip. It changes the spatial emission of the light to the effect that an angular range around the light guide 1 is shadowed and the brightness in the remaining angular range is increased. The color of the emitted light can also be influenced by a suitable coloration or pigmentation of the effect portion. Thus, it is possible to provide a light guide 1 having a tube 3 with the fiber bundle 8 that appears as a bright line in a first color against a background of light that reflects diffusely at the effect portion with another color.

In general, without any limitation to the illustrated example, it is provided in accordance with yet another embodiment that, in the tube together with the at least one light-guiding fiber 7, a functional element that extends in the longitudinal direction of the light guide 1 is carried. Such a functional element can be, in particular, an electrical conductor 27 or a reinforcement element 28. Coming into consideration as a reinforcement element 28 is a metal or plastic wire or cord. An electrical conductor 27 can also have, at the same time, the function of a stability-enhancing reinforcement element 28. Furthermore, it is also conceivable to arrange such a functional element in the cladding 5 outside of the tube 3.

Figure 8:
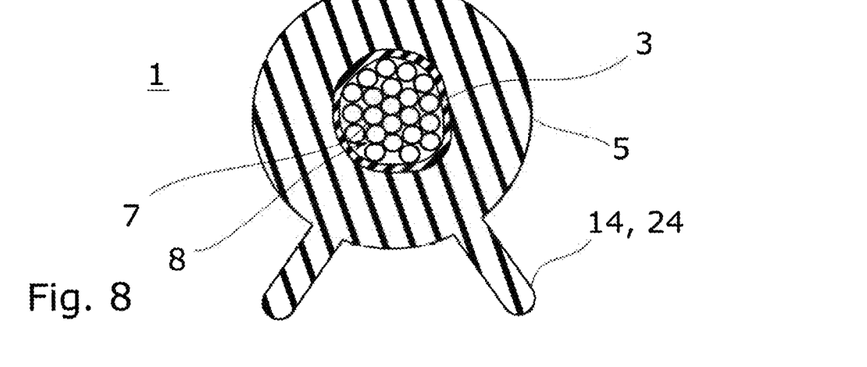
FIGS. 8-10 show, in cross-sectional view, variants of a light guide with a fastening element.
Figure 9:
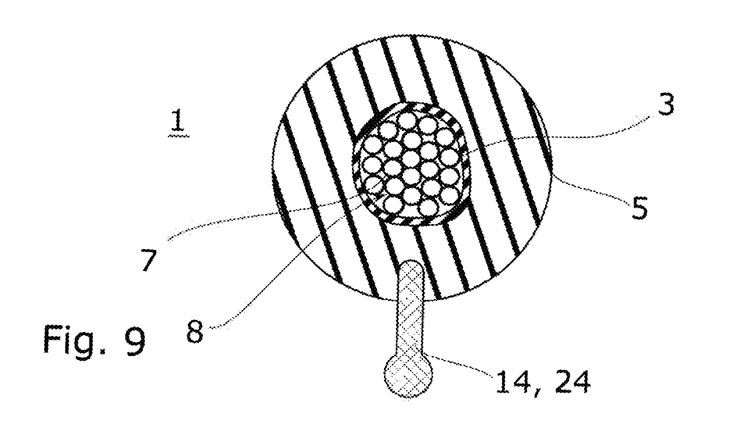

The design of the light guide 1 with a cladding 5 made of plastic makes possible the fabrication thereof in a strand-forming process, such as, for example, by extrusion. This process enables the production of even complex geometries in a very simple way. For this purpose, in one embodiment, it is provided that the cladding 5 has a fastening element 14, which is in the form of a spring or rib 25 and extends axially along the light guide 1. For this purpose, FIG. 8 shows an example in which two such ribs 24 have been shaped in the cladding 5. In contrast to what is illustrated, the fastening element can also represent a separate element, which is anchored in the cladding 5. An example of this embodiment is shown in FIG. 9. The rib 24 can be, for example, a prefabricated element made of another plastic that differs from the material of the cladding 5 or also a metal element. During extrusion, the rib 24 in the form of a separate element can be anchored, for example, in the cladding 5, just like the tube 3. In order to mount the light guide 1, the light guide with the rib 24 can then be inserted in a corresponding groove of a structural part that is to be furnished with the light guide 1.

Figure 10:
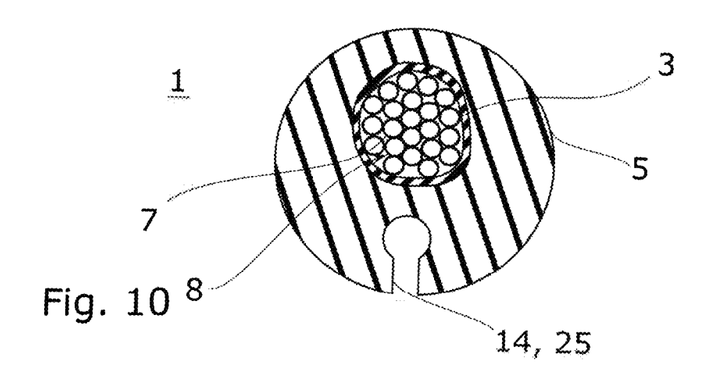

FIG. 10 is an example of another embodiment. In this embodiment, a fastening element 14 in the form of a groove 25 that extends axially along the light guide 1 is provided. As illustrated, the groove 25 can be introduced directly in the cladding 5 or also can be shaped out of the form of the cladding 5. In the hitherto illustrated examples, the tube 3 with the fiber bundle 8 was arranged more or less centered in the cross section of the cladding. The example of FIG. 10 further shows that an eccentric arrangement is also possible.

Figure 11:
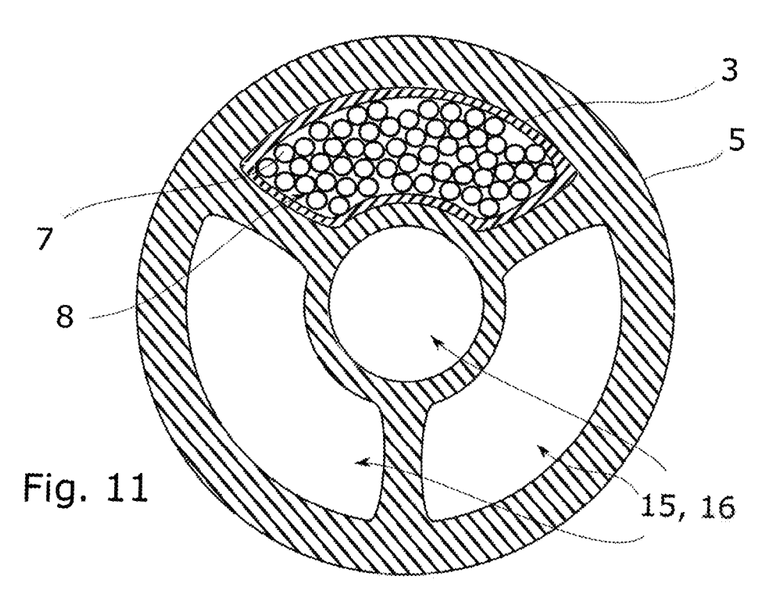
FIG. 11 is an example of a light guide with additional channels in the longitudinal direction.

In accordance with yet another embodiment, the cladding 5 can have at least one channel 15, which extends in the axial direction, in particular in the form of a cavity 16. An example for such an embodiment is shown in FIG. 11. In this example, there are three channels 15, each of which form cavities 16. In contrast to what is illustrated, the channels 15 can also be filled in with cords, wires, or a filling material, for example. FIG. 11 is also an example showing that the cross section of the tube 3 with the fiber bundle 8 accommodated therein does not need to be circular in shape, but that rather the arrangement enables the realization of many variants in terms of the cross-sectional shape. In this example, the tube has the cross-sectional shape of a sector of a circular ring, as do likewise the two laterally adjacent channels 15.

Figure 12:
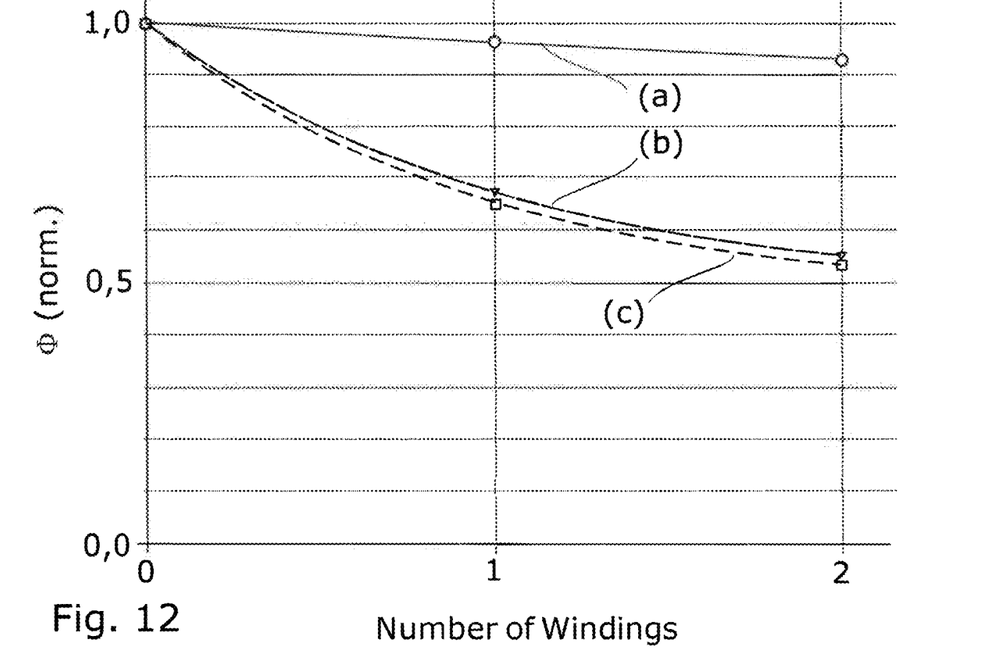
FIGS. 12-13 are diagrams with measured values of the luminous flux of light guides before and after a bending.
Figure 13:
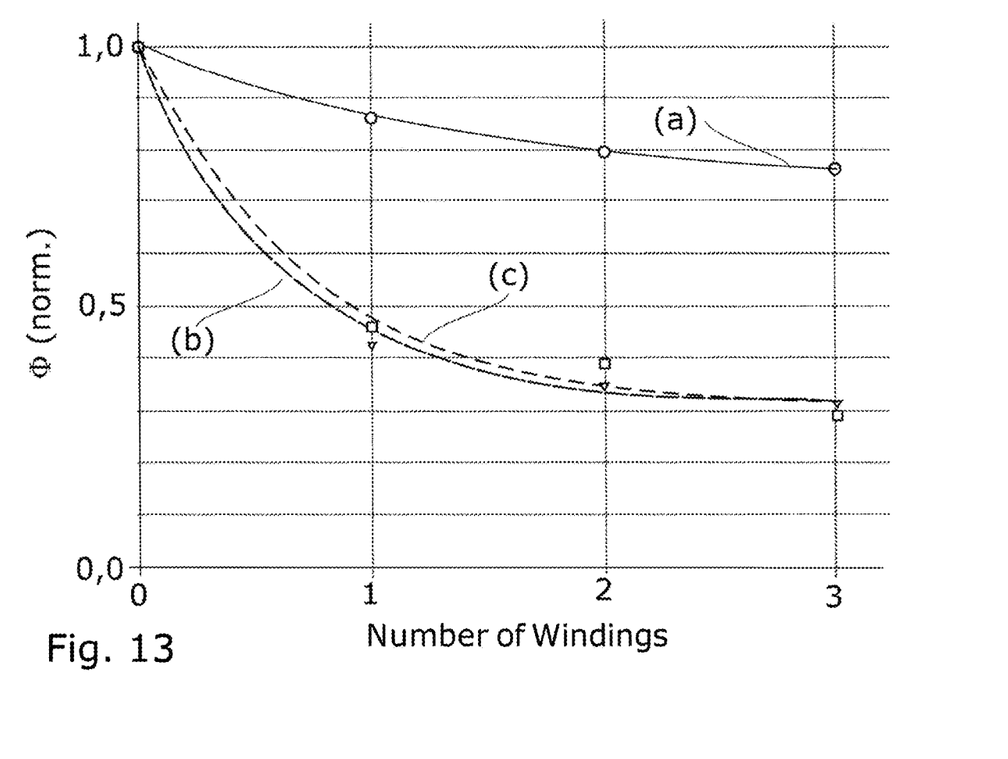

In general, the light guide 1 described here is characterized by a high resistance toward any change in the optical properties after a bending of the light guide. This is because the light emission properties are governed essentially by the tube 3 and the fibers 7 contained in it. In particular, in accordance with one embodiment, it holds true that the additional light losses caused by the bending of the light guide 1 for a bending radius of the light guide 1 of 21 mm is less than 0.1 times the total luminous intensity carried per winding of the light guide 1. Furthermore, the additional light losses caused by a bending of the light guide 1 for a bending radius of the light guide 1 of 12 mm is less than 0.3 times the total luminous intensity carried in the light guide per winding of the light guide 1. These properties apply, in particular, for light guides 1 with an outer diameter or a diameter of the cladding of 3 mm or less, in particular also for light guides with a diameter in the range of 1 to 3 millimeters. The additional light losses, that is, the light losses in addition to those caused by emission of the side-emitting light guide, can otherwise be seen as sections that appear brighter in comparison to neighboring regions. Accordingly, the light emission then appears non-uniform along the light guide with a more brightly shining region or a plurality of more brightly shining regions. Moreover, this additionally out-coupled light is absent in the further length of the light guide, so that this length is then darker overall. To this end, FIG. 12 and FIG. 13 show the measurements of the luminous flux before and after winding of the light guide with one winding or a plurality of windings. FIG. 12 shows the flux in the original state and after winding with one winding and with two windings with a bending radius of 21 millimeters.

FIG. 13 shows a similar diagram with measured values after winding with one to three windings and a bending radius of 12 millimeters. Curve (a) shows, in both diagrams, the measured values for a light guide 1 such as that described herein. For comparison, the curves (b) and (c) show measured values for conventional side-emitting polymeric light guides. The measured values are each normalized to the value without bending. As can be seen, for the light guide described herein, the emitted intensity is hardly influenced by the strong bending. Even after winding with three windings with a bending radius of 12 mm, the flux is greater than 70% of the original value (FIG. 13). For light guides of the prior art (curves (b) and (c)), in contrast, reductions in the fluxes by nearly half (FIG. 12) after two windings with a bending radius of 21 mm and by nearly 2/3 (FIG. 13) for three windings with a bending radius of 12 mm are found.

The light guide described herein also enables an especially high homogeneity of the emitted light to be achieved. This results, in particular, from the fact that the angular distribution of the light emitted by the individual light-guiding fibers 7 is further homogenized by the scattering in the walls of the tube 3. In one embodiment, it is provided that the light guide 1 has an angular distribution of the emitted light in which, for the asymmetry $A=(I_{45°}-I_{135°})/(I_{45°}+I_{135°})$ of the luminous intensity $I_{45°}$ of the light emitted at an angle of 45° to the light-guiding direction and of the luminous intensity $I_{135°}$ of the light emitted at an angle of 135° to the light-guiding direction, the following applies: $A<0.1$, preferably $A<0.05$. This asymmetry expresses the difference between the emission of light with a directional component in the forward direction in relation to the emission of light with a directional component in the backward direction (that is, opposite to the direction of the light guiding).

Figure 14:
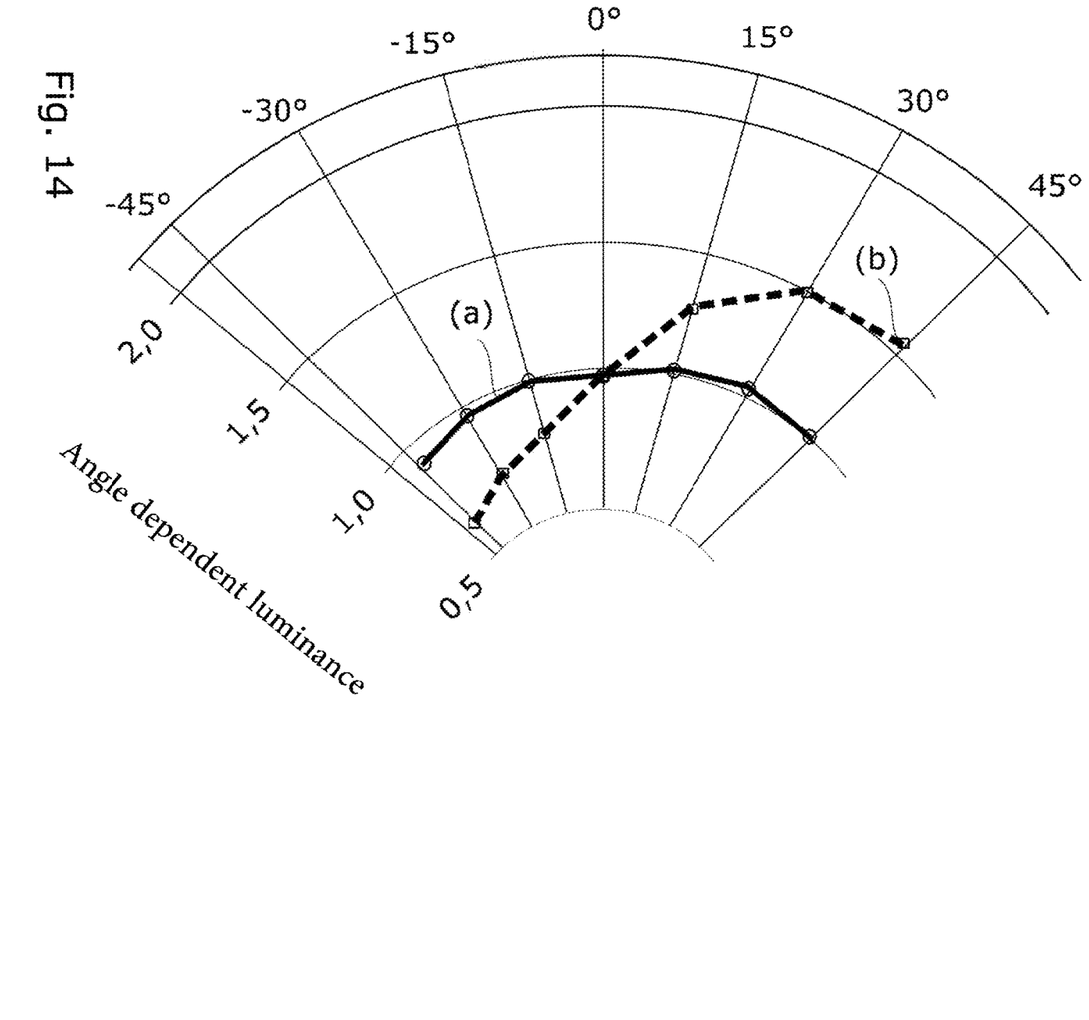
FIG. 14 shows the angle-dependent luminance for two light guides.

The low asymmetry in the emission is highlighted on the basis of FIG. 14. In FIG. 14, two curves (a) and (b) with measured values of the angle-dependent luminance for two light guides are illustrated. Curve (a) shows the measured values for a light guide 1 in accordance with this disclosure with a diameter of 2 mm. For comparison, curve (b) shows a light guide with a fiber bundle, but without a translucent, light-scattering tube 3. It is clearly seen that the emission for a light guide in accordance with this disclosure is nearly perfectly homogeneous or independent of the angle. In contrast, a marked forward scattering is shown for curve (b). The emission with a directional component in the direction of the light guiding is markedly more intense in comparison to the emission opposite to the light-guiding direction.

Figure 15:
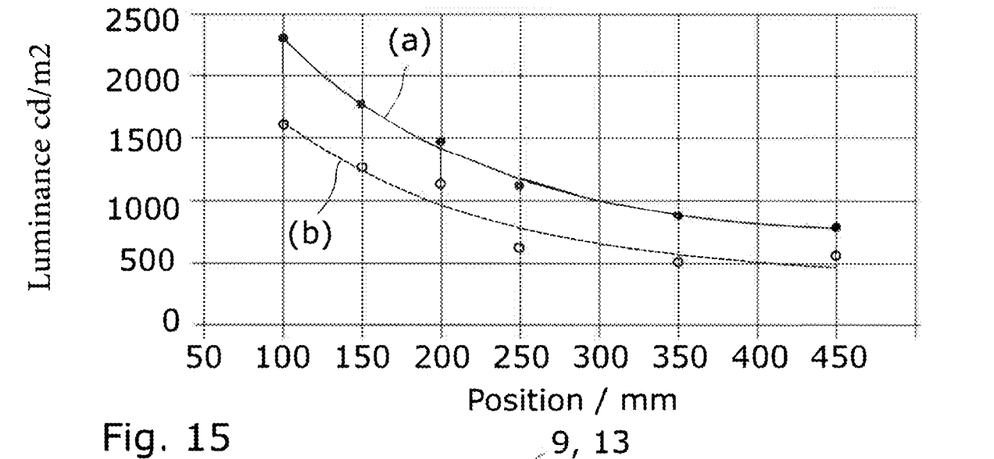
FIG. 15 shows the luminance as a function of the longitudinal position along two light guides.

The arrangement in accordance with this disclosure also leads to a markedly higher luminance in comparison to previous side-emitting polymeric light guides. This is shown in the example of FIG. 15. In the diagram shown here, the luminance was measured as a function of the longitudinal position at the light guide 1. Owing to the fact that the light is gradually scattered out of the light guide 1, the luminance declines with greater distance toward the end of the light guide having the light emitter. Due to the fact that the fibers are combined with the tube to form a tight bundle of small diameter, there results a higher luminance and thus apparent higher brightness (curve (a)) in comparison to a light guide in which the fibers are carried in a simple transparent tube (curve (b)).

One factor that influences the luminance is the refraction at the outer surface of the cladding 5. In a light guide 1 with a round cross section, the outer surface of the cladding acts like a cylindrical lens. This increases the actively shining part of the light guide 1, namely, the tube 3 with the fiber bundle 8 carried therein. As a result of this optical increase, however, the luminance correspondingly declines. Even when this effect does not have a direct influence on the total emitted luminous flux, the actively shining part appears to be larger, but accordingly darker. This effect is detrimental when the focus is to utilize the light guide as a design element that creates optical accents in the form of a shining line. In the case of lower luminance, the light guide may no longer be noticeable optically, if needed, in a bright surrounding, for example, so that this effect loses its function of providing an optical accent. Therefore, it would be desirable to structure a light guide 1 with an inner, side-emitting, in particular strand-shaped or elongated part, and to structure a cladding that surrounds this part in such a way that an optical enlargement effect at the outer surface of the cladding 5, caused by refraction at the outer surface, is at least minimized. This object is accomplished, in general, by an elongated side-emitting light guide, which has an inner elongated part, which may also be referred to as a core, and a cladding 5 that surrounds the inner part, whereby light can be guided into the inner part by in-coupling at one of the ends 10, 11 of the light guide 1 and is gradually directed toward the outside by scattering or refraction laterally out of the inner part through the cladding 5, so that the inner part, as viewed through the cladding 5, appears as an elongated, in particular linear or thread-shaped shining element, whereby, between the inner part and the cladding 5, a layer that surrounds the inner part is present and has an index of refraction that is less than the index of refraction of the cladding 5.

Figure 16:
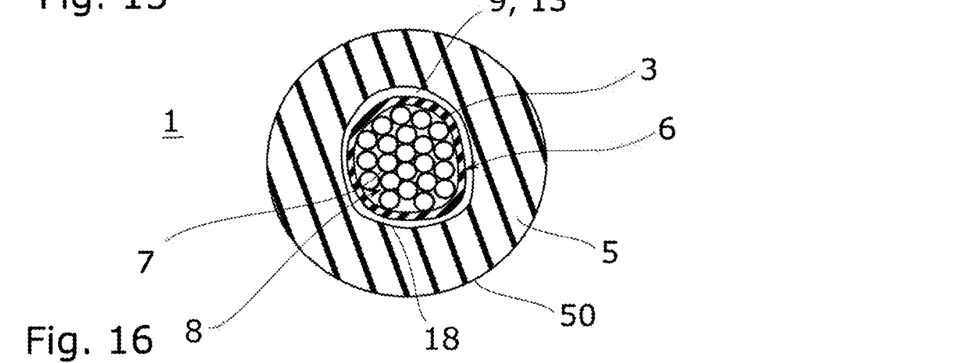
FIG. 16 represents a light guide with a region of lower refractive index surrounding the tube.

In a further development of the previously depicted embodiment, the inner part is formed by the tube 3 with the fiber bundle 8 contained in it, since the tube 3 is the part of the light guide 1 that appears as a linear or thread-shaped light source. An example of such an embodiment, namely, a light guide 1 with a layer 9 of low index of refraction that surrounds the tube 3, is shown in FIG. 16. As stated, the tube 3 with the fiber bundle 8 forms the inner part 6 that is enclosed by the layer 9. In the simplest and, in terms of the optical effect, especially effective case, a gap or separation is present between the cladding 5 and the inner part 6, so that the layer 9 is formed by a fluid layer, in particular an air layer or, more generally, a gas layer. In a further development of the previous embodiments, a fluid-filled gap, in particular a gas-filled gap, more preferably an air-filled gap, is present between the tube 3 and the cladding 9.

In another embodiment, however, the inner part 6 can also be formed by a single side-emitting fiber. In general, the inner part 6 represents here the part that appears as a shining element. In general, this shining element is defined by the scattering elements, which appear to shine, and, to the observer, represent the originating point of the emitted light.

Figure 17:
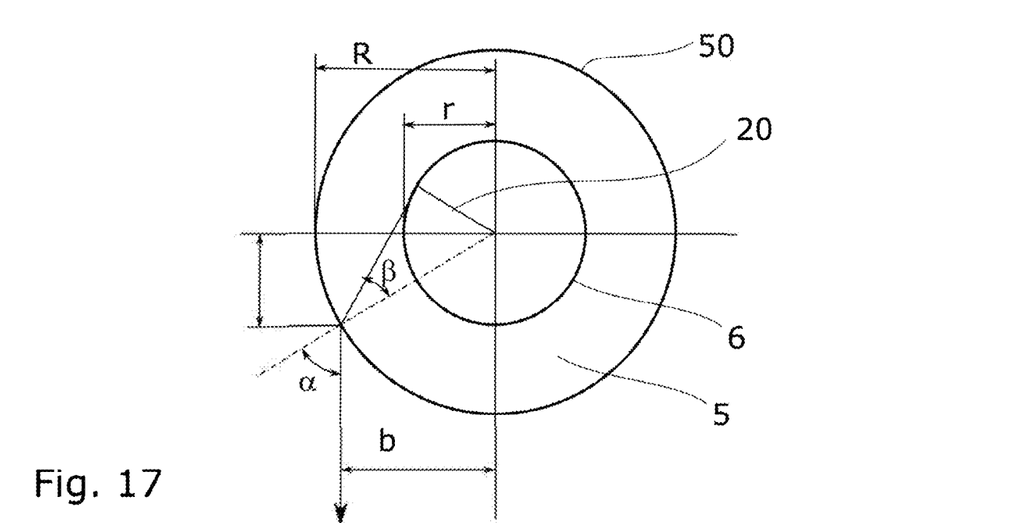
FIG. 17 shows the beam path at a light guide.

When a fixed connection between a white, shining core or inner part and a transparent cladding is assumed, then the light emitted from the inner part is conveyed by the transparent cladding 5 uniformly over all angles in a distributed manner and carried toward the outside at its surface 50 in accordance with the law of refraction. It is thereby to be noted that an observer at a distance of observation that should be greater by multiple times than the cable diameter (which, in practice, is usually the case) can perceive with the eye only the beams of light that are emitted from the cladding in an essentially parallel manner. All beams of light that are emitted from the surface at other angles are not projected onto the retina in the eye and, for this reason, are not perceived. In this case, the schematic drawing of FIG. 17 illustrates the underlying beam path. By use of the law of refraction, it is possible to determine the borderline case where the outermost parallel beams of light that can still be perceived by the eye are situated, which then form the perceived diameter of the illumination. For the angles α, β of this light beam 20, the following applies in accordance with the law of refraction:

$$\frac{\sin\alpha}{\sin\beta} = \frac{n_{cladding}}{n_{air}} \tag{1}$$

with sin $$\alpha = \frac{b}{R} \text{ and } \sin\beta = \frac{r}{R},$$

the perceivable diameter is given by $D_{vis}$:

$$D_{vis} = 2 \cdot r \cdot n_{cladding} \tag{2}$$

This diameter corresponds to twice the path distance b in accordance with FIG. 17. For an index of refraction of the transparent cladding of $n_{cladding}=1.5$, approximately, and a diameter of the white shining core or inner part 6 or 2·r of $d_{core}=2.1$ mm, a perceivable length of the diameter $D_{vis}$ of 3.2 mm is obtained. This corresponds to the outer diameter of the transparent cladding 5. Therefore, although a shining core that is smaller in comparison to the outer diameter is used, this does not lead to a desired increase in the luminance due to a smaller perceived area.

Only for smaller diameters of the inner part of 0.3 mm, for example, is a shining diameter of 0.45 mm perceived in this case, which is much smaller than the outer diameter of the light guide 1 of 3.2 mm and accordingly leads to the desired increase in the luminance.

However, if a layer 9 with a lower index of refraction, in particular an air gap, between the shining core or inner part 6 and the transparent cladding 5 is present, there ensues an additional refraction of the light also at the inner surface of the transparent cladding, namely, at the interface between the cladding 5 and the layer 9, so that new ratios result for the perceivable shining diameter. However, these can no longer be calculated analytically, but rather are determined numerically or graphically by means of a simulation. It is found that, surprisingly, even a shining perceived diameter that is somewhat smaller than the diameter of the white, shining core or inner part 6 can be achieved. The effect of an increase in the luminance brought about by the layer 9 is created in this case, in particular, by the shape of the interface between layer 9 and cladding. In general, the interface 18 forms an essentially, or at least partly or sectionally, concavely formed refractive surface. In accordance with a preferred further development, therefore, it is provided that the interface 18 between the cladding 5 and the layer 9 forms a concave refractive surface, so that it acts as a refractive surface of a diverging lens or of a defocusing optical element in the plane perpendicular to the longitudinal direction of the light guide 1.

Taking into account the previous consideration, in a further development of the invention, it is generally preferred that the inner part 6 has a diameter of at least 0.75 millimeters. Below this diameter, the effect is likewise still present, but it is less noticeable on account of the already small diameter.

Figure 18A:
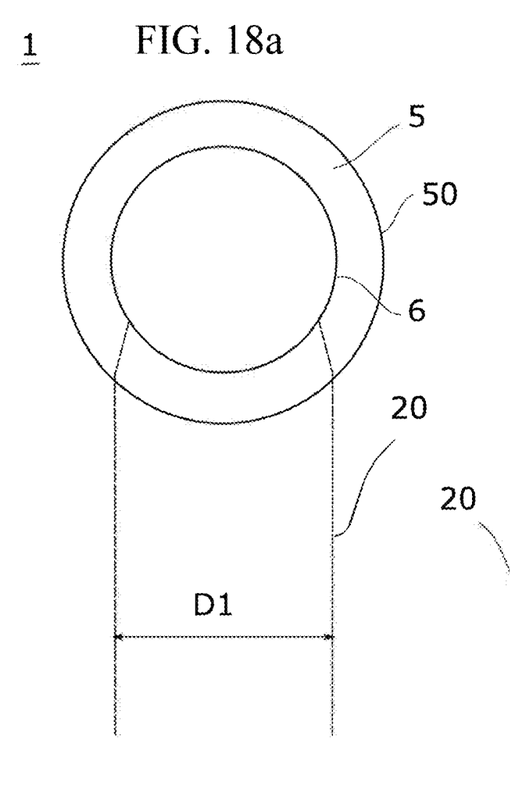
FIGS. 18a-18b show simulations of the light emission for a light guide with and without an air gap between the cladding and the shining inner part.
Figure 18B:
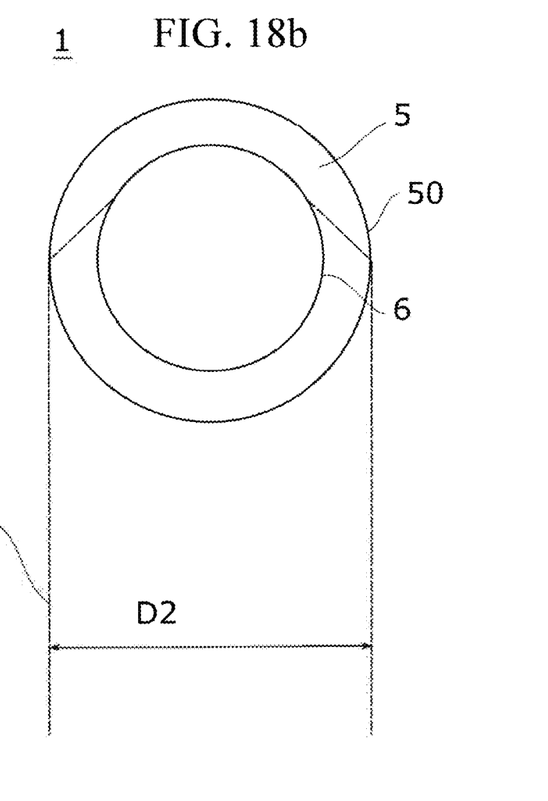

FIGS. 18*a* and 18*b* show two simulations of the beam paths for a light guide 1 with an air gap (FIG. 18*a*) and without an air gap (FIG. 18*b*). In FIG. 18*a*, the air gap is not drawn for simplicity.

It is clearly seen that the apparent diameter D1 of the shining inner part 6 is markedly smaller for an observer in the embodiment with an air gap than the diameter D2 in the embodiment without an air gap (FIG. 18*b*). It is even possible that the apparent diameter is smaller than the actual diameter. The air gap or, more generally, the layer 9 with a lower index of refraction thereby effectively increases the luminance.

Figure 19:
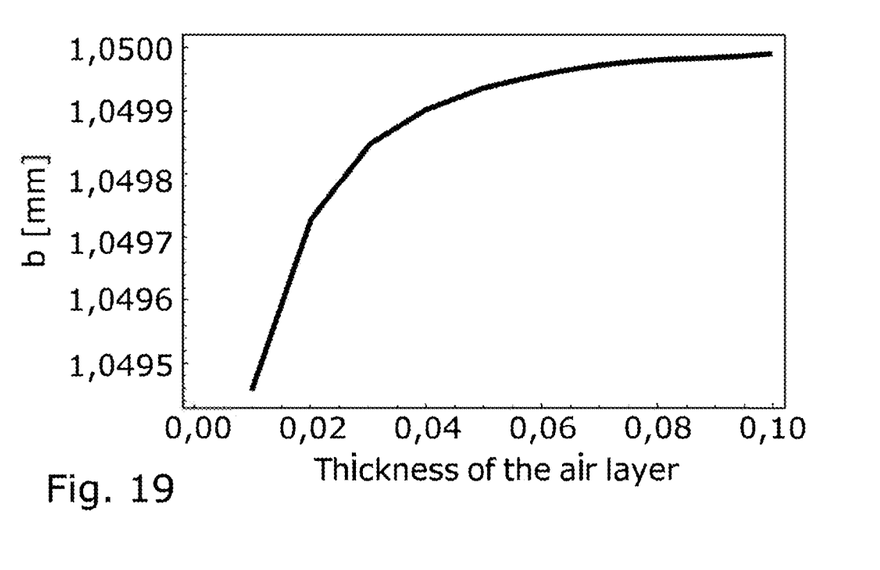
FIG. 19 is a diagram of the apparent width of the shining inner part as a function of the width of the air gap.

The thickness of the layer 9, preferably of the air gap, is overall of little relevance. This is shown in the diagram of FIG. 19. In this diagram, the apparent half-width b, as it is interpreted in FIG. 17, is plotted as a function of the width of the air gap. The apparent half-width b corresponds to the apparent half-diameter of the inner part 6 or the apparent radius. As can be read off the diagram, the consequences of the width of the air gap on the apparent width of the inner part 6 are minimal. Therefore, the layer 9 can be kept very thin. In general, for this purpose, without any limitation to the illustrated example, it is provided in one embodiment that, for the ratio of the diameter of the inner part 6, D6, to the diameter D9 of the layer 9, the following applies:

$$1 - \frac{D_6}{D_9} \leq 0.3 \tag{3}$$

As stated, the light guides 1 do not need to have a circular cross section. The above relation (3) can be formulated correspondingly here for the cross-sectional areas of the enclosing curves of the inner part 6 and the layer 9. In this case, in accordance with another embodiment, the following applies:

$$1 - \frac{A_6}{A_9} \leq 0.09. \tag{4}$$

Here, $A_6$ refers to the area enclosed by the outer bordering curve of the cross section of the inner part 6 and $A_9$ refers to the area enclosed by the outer bordering curve of the cross section of the layer 9.

It is usually sufficient to prevent or eliminate a connection of the tube 3 or of the surface of the inner part 6 to the cladding 5. A gas-filled gap, in particular an air gap, of adequate width is then maintained by the surface roughness of the surfaces. This also applies in the case when the light guide is bent with nearly any desired bending radii. It is also possible for a sizing with particles to be present on the tube 3 or, more generally, on the inner part 6, whereby the particles keep apart the cladding 5 and the surface of the inner part and create a gap. In a gas-filled gap, a dry gaseous medium with a dew point of at most −20° C. is preferably used, in order to prevent any condensation in the gap. Dry air or an inert gas filling is suitable, for example.

The light guide 1, such as that described here, is suitable especially as contour lighting or, more generally, as decorative lighting and thereby also as a design element for interior spaces of buildings and vehicles. As a design element of this kind, the light guide can be utilized to provide such lighting in interior spaces of buildings as well as for their furnishings, such as, for example, in furniture, or at or in instruments and machines as well as in the outside area of buildings, such as, for instance, on facades, as well as for the interior and exterior illumination of vehicles. Vehicles can be wheeled vehicles or railed vehicles, ships, and aircraft.

In particular in the case of vehicles, such as automobiles, aircraft, ships, and/or trains, the light guide can be used as a part of the inner trim of vehicles. In the area of interior decoration, the light guide can be utilized as a part of furniture and, in particular, of vehicle seats, interior designs, and/or kitchens. Further applications are use as a component part of a spotlight (40), in particular a vehicle headlight, illumination of landing strips for aircraft, use, together with other light guides and/or other side-emitting step index fibers, for the formation of a fabric structure, which, on its part, can form an illuminating body, background lighting of displays, use as ambient or side-marker lights in vehicles, ships, aircraft, buildings, streets, way markers, street signs, textiles, use as safety lighting having self-luminescent phosphorescent additives.

Another application is use in or on medical technology devices, such as, for example, as accent or contour or safety lighting. It is further also provided to use the light guide 1 or the light source 2 as a device or at least as a component of a device for a medical therapy procedure, in particular for a photodynamic therapy (PDT) for use in tumor therapy, for an endovenous laser therapy (EVLT) for the treatment of varicose veins, for a laser-induced interstitial thermotherapy (LITT), or for applications in the fields of ophthalmology, dentistry, and dermatology, particularly in the latter instance, that is, for promoting the healing of wounds. In terms of use in the general field of medical technology, it is further advantageous when the plastic used and the plastics used, that is, also the polymer blends, preferably comprise biocompatible plastic materials, which, for example, are listed in accordance with the standards EN ISO 10993-1:2018 or EN ISO 10993-5:2009 or USP Class VI. In addition, the material that is utilized should be chosen in such a way that it can be sterilized, in particular by sterilizing with ethylene oxide (EO), because this sterilization method is of interest, in particular, in single-use applications (disposable applications) in the field of medical technology, such as described in ISO 11135:2014. Attention should be paid here, in particular, to the absence of chlorine in the material, because, during the EO process, chlorine-containing compounds can otherwise form and, on the one hand, can be toxic and, on the other hand, can only be completely eliminated after the sterilization process.

Figure 20:
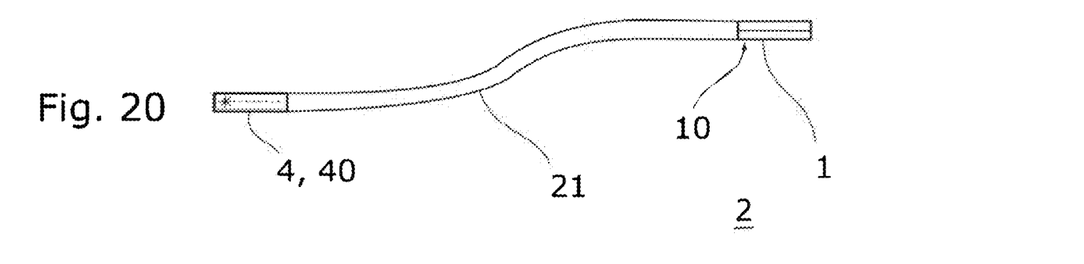
FIG. 20 shows a light source in which the light is coupled into the side-emitting light guide via another light guide.

One embodiment of a light source 2 that, among other things and in particular, is also suitable for medical applications is shown in FIG. 20. In this embodiment, the light of the light emitter 4 is coupled into another light guide 21, which is optically connected to one end 10 of the side-emitting light guide 1. This embodiment is then especially appropriate when the additional light guide 21 is also flexible in design. Preferably, a short section for the side-emitting light guide is used in this case. Thus, in a further development of this embodiment, it is conceived to use a light guide with a length in the range of 5 mm to 50 mm. The light guide 1 serves here as a diffuser for the light conveyed into the additional light guide 21. For medical applications, the diffuser can be brought to an intended position at or in the body of a patient being treated and the light can be emitted there via the light guide 1. For optical coupling to the light guide 1, the additional light guide 21 can be fused to or adhesively attached to the light guide 1. For high luminous intensities, the use of a laser 40 is generally offered here as a light emitter 4.

In summary, without any limitation to the special illustrated example, a light source 2 is provided in which the side-emitting light guide 1 is joined to another flexible light guide 21 and whereby a light emitter 4, preferably a laser 40, is coupled to the additional flexible light guide 21, so that, via the additional light guide 21, the light of the light emitter 4 is coupled into the side-emitting light guide 1 and is emitted along the side-emitting light guide 1. This light source 2 can be utilized, in particular, for the above-mentioned medical applications.

The basic function of the side-emitting light guide 1 is effected by the light scattering in or at the tube 3. Besides the scattering property, however, the light guide 1 can also have, quite generally, filtering properties, or the spectrum of the emitted light can change in comparison to the spectrum of the in-coupled light. In this way, it is possible to achieve a large number of light effects. In accordance with one embodiment, the tube 3 contains pigments or other colored scattering particles. These scattering particles absorb portions of the light depending on the wavelength, so that the reflected or scattered light also differs spectrally from the light guided in the core and is given a coloration. In accordance with another alternative or additional embodiment, at least one of the plastics of tube 3 and cladding 5 is colored. In general, the coloring agent does not increase the scattering, so that the plastic remains transparent. The coloring agent in accordance with this embodiment is therefore accordingly not a pigment. Through the partial spectral absorption of the coloring agent, the spectral distribution of the light that passes through the plastic is altered. If needed, the coloring agent is provided by the polymer used or by a polymer component itself, which is distinct from the alternative of having coloring agent molecules dissolved in the polymer matrix.

Yet another possibility for spectrally influencing the light is the conversion to other wavelengths, that is, the conversion of light of one wavelength to light of at least one other wavelength with the use of a suitable conversion material. This is advantageous in order to lose little intensity in the case of a spectral change in the emitted light. Such a conversion is achieved, in particular, in that the light guide 1 contains a photoluminescent material. The photoluminescence can be both a fluorescence as well as a phosphorescence. The photoluminescent material can be contained in one component or in a plurality of components of the light guide 1 and can come into contact with the light, in particular in the soul 3 and in the cladding 5. For example, the tube 3 can contain photoluminescent particles 30. Thus, it is possible, for example, for blue light to be fed in and scattered at the tube 3 and partially converted to yellow light in order for white light to be emitted by the mixture of these components. For example, however, it is also possible for a photoluminescent material to be contained in the cladding, in order to convert at least a part of the luminous intensity during passage of the light that is scattered out of the tube 3. In this case, the different optical effects that can be achieved are clearly evident. For a colored cladding 5, the color impression of the brightly shining tube 3 is changed for the observer. In the case of a photoluminescent coloring agent in the cladding 5, a light glow is created around the brightly shining tube 3, whereby this light glow has a color that is different from that of the light emitted directly from the tube 3.

When phosphorescing additives are used, it is possible to produce an afterglow effect of the light guide, even when the light source of the light guide is switched off. It is thereby possible to create a safety lighting for use in hospitals, for example. Moreover, the phosphorescing particles in the light guide are also excited by external light, so that such a light guide can also be utilized as a passive safety lighting or as an accent lighting.

One use of the light guide according to the invention is especially advantageous, based on its insensitivity to bending, for utilization in photobioreactors or any other kind of photobiological processes. In this case, the light guides can be put in place both from the outside onto (transparent) reactors or, regardless of the transparency of the reactor wall, in the interior of such reactors, because the light guides are opaque to liquids and are stable against chemicals.

All of the mentioned variants can also be integrated or employed only in sections in the light guide, while other sections do not have these functionalities. It is thereby possible to achieve a plurality of effects. It is also possible for sections to have no laterally light-emitting properties, so that the light can be transported to more remote points with little loss.

In general, radiation sources for the light guide can be utilized in a wavelength range of 150 nm to 15 µm, depending on the fiber materials used and the desired application. Conceivable here are any kind of laser sources, LEDs, arc lamps, filament lamps, or any other kind of suitable radiation sources.

LIST OF REFERENCE NUMBERS 1 light guide
2 light source
3 tube
4 light emitter
5 cladding
6 inner part of 1
7 Fiber
8 fiber bundle
9 layer
10, 11 ends of 1
12 bend in 1
13 gap
14 fastening element
15 channel
16 cavity
18 interface between 5 and 9
19 optical-effect portion
20 light beam
21 additional light guide
24 rib
25 groove
27 electrical conductor
28 reinforcement element
40 laser
50 outer surface of 5
70 fiber sheath
72 fiber core
73 interface between 70, 72
74 soul
75 light-scattering element

What is claimed is:

1. A side-emitting light guide, comprising:
a light-guiding fiber configured as a side-emitting fiber so that light guided in the light-guiding fiber is scattered out along a longitudinal direction in a distributed manner;
a tube surrounding the light-guiding fiber, wherein the tube is light scattering and translucent so that the light emitted from the light-guiding fiber traverses the tube with scattering;
a cladding surrounding the tube, wherein the tube and the cladding are made of plastic, wherein the light-guiding fiber is carried loosely in the tube; and
a gap between the tube and the cladding, wherein the gap comprises a gas.

2. The side-emitting light guide of claim 1, further comprising a fiber bundle with a plurality of the light-guiding fiber, the tube surrounding the fiber bundle.

3. The side-emitting light guide of claim 2, wherein the fiber bundle is carried loosely in the tube.

4. The side-emitting light guide of claim 2, wherein the fiber bundle has a cross-sectional area in a range of 0.19 $mm^2$ to 19.7 $mm^2$ and/or the fiber bundle has a diameter in a range of 0.5 mm to 5 mm.

5. The side-emitting light guide of claim 2, wherein the tube is plastic tube shrunk around the fiber bundle at least partially or at least in sections.

6. The side-emitting light guide of claim 1, wherein the tube has a wall thickness that is smaller by at least a factor of five than an outer diameter of the cladding, and wherein the outer diameter of the cladding is at least 1 millimeter.

7. The side-emitting light guide of claim 1, wherein the tube has a wall thickness that is less than 200 micrometers.

8. The side-emitting light guide of claim 1, further comprising a feature selected from a group consisting of: a ratio of a diameter of the cladding to a diameter of the tube that is at least 1.5/1; a ratio of a cross-sectional area enclosed by an outer contour of the cladding to an area enclosed by an outer contour of the tube that is at least 2.25/1; the light-guiding fiber comprises a side-emitting glass fiber; the light-guiding fiber has a diameter in a range from 10 to 250 µm; the light-guiding fiber has a diameter in a range from 20 µm to 100 µm; the light-guiding fiber has a diameter in a range from 30 µm to 70 µm; and combinations thereof.

9. The side-emitting light guide of claim 1, wherein the light-guiding fiber has a fiber core surrounded by a fiber sheath, wherein the fiber core has a higher index of refraction than the fiber sheath, and wherein the light-guiding fiber comprises a feature selected from a group consisting of: a light-scattering interior element extending in the fiber core in a longitudinal direction of the light-guiding fiber; light-scattering elements at an interface between the fiber core and the fiber sheath; a scattering region comprising scattering centers present at least partially or in sections at an interface between the fiber core and the fiber sheath; light-scattering elements distributed in the fiber core; light-scattering elements distributed in the fiber sheath; and any combinations thereof.

10. The side-emitting light guide of claim 1, wherein the tube is plastic tube shrunk around the light-guiding fiber at least partially or at least in sections.

11. The side-emitting light guide of claim 1, wherein the plastic of the cladding and/or the tube comprises a polymer blend.

12. The side-emitting light guide of claim 11, wherein the polymer blend comprises a polymer selected from a group consisting of aliphatic polyurethane, thermoplastic elastomer, polymethyl methacrylate, and polycarbonate.

13. The side-emitting light guide of claim 11, wherein the polymer blend comprises polymethyl methacrylate and thermoplastic polyurethane.

14. The side-emitting light guide of claim 1, wherein the plastic of the cladding comprises an additive substance selected from a group consisting of a UV stabilizer, an impact-strength modifier, a flame retardant, and combinations thereof.

15. The side-emitting light guide of claim 1, further comprising:
a light loss caused by bending the light-guiding fiber to a bending radius of 21 mm that is less than 0.1 times a total luminous intensity carried in the light-guiding fiber per winding of the light-guiding fiber; and/or
a light loss caused by bending the light-guiding fiber to a bending radius of 12 mm that is less than 0.3 times a total luminous intensity carried in the light-guiding fiber per winding of the light-guiding fiber.

16. The side-emitting light guide of claim 1, wherein the light-guiding fiber has an angular distribution of emitted light, in which, for a asymmetry $A=(I_{45°}-I_{135°})/(I_{45°}+I_{135°})$ for a luminous intensity $I_{45°}$ of light emitted at an angle of 45° to a light-guiding direction and for a luminous intensity $I_{135°}$ of light emitted at an angle of 135° to the light-guiding direction, the following applies: $A<0.1$.

17. The side-emitting light guide of claim 1, wherein the cladding has a fastening element and/or a channel that extends axially along the light-guiding fiber.

18. The side-emitting light guide of claim 1, further comprising a feature selected from a group consisting of: the light-guiding fiber having an elongated optical-effect portion joined to the cladding and extending along a longitudinal direction of the light-guiding fiber, wherein the elongated optical-effect portion influences emitted light in a manner selected from a group consisting of color, brightness, and direction of emission; the light-guiding fiber having an elongated optical-effect portion recessed in the cladding and extending along a longitudinal direction of the light-guiding fiber, wherein the elongated optical-effect portion influences emitted light in a manner selected from a group consisting of color, brightness, and direction of emission; the light-guiding fiber is configured to alter a spectrum of emitted light in comparison to a spectrum of in-coupled light; the tube comprises pigments; the tube comprises colored scattering particles; the plastic of the core is colored; the plastic of the cladding is colored; the light-guiding fiber comprises a photoluminescent material; and any combinations thereof.

19. The side-emitting light guide of claim 1, further comprising an inner elongated part surrounded by the cladding, wherein the inner elongated part guides light by in-coupling at one end of the light-guiding fiber and directs the light toward an outside by scattering or refraction laterally out of the inner elongated part through the cladding so that the inner elongated part, as viewed through the cladding, appears as a linear or thread-shaped shining element, wherein the inner elongated part has a layer that surrounds the inner elongated part between the inner elongated part and the cladding and has an index of refraction that is lower than an index of refraction of the cladding.

20. The side-emitting light guide of claim 19, further comprising:
a first ratio of a diameter ($D_6$) of the inner elongated part to a diameter ($D_9$) of the layer, wherein, for the first ratio, the following applies:

$$1 - \frac{D_6}{D_9} \leq 0.3;$$

and/or
a ratio of an area enclosed by an outer bordering curve of a cross section of the inner elongated part ($A_6$) and an area enclosed by an outer bordering curve of a cross section of the layer ($A_9$), wherein for the second ratio the following applies:

$$1 - \frac{A_6}{A_9} \leq 0.09.$$

21. A light source, comprising:
the side-emitting light guide of claim 1; and
a light emitter optically coupled to one end of the side-emitting light guide.

22. A method for producing a side-emitting light guide, comprising:
arranging a light-guiding, side-emitting fiber in a tube so that the light-guiding fiber is carried loosely in the tube, wherein the tube is light-scattering and translucent and is made of plastic;
surrounding the tube with the light-guiding fiber contained therein with a cladding made of plastic so that a gap remains between the tube and the cladding; and
filling the gap with a gas.

23. The method of claim 22, wherein the step of arranging the light-guiding, side-emitting fiber in the tube further comprises arranging such that the light-guiding fiber is carried loosely in the tube.

24. A side-emitting light guide, comprising:
a light-guiding fiber configured as a side-emitting fiber so that light guided in the light-guiding fiber is scattered out along a longitudinal direction in a distributed manner;
a tube loosely surrounding the light-guiding fiber, wherein the tube is light scattering and translucent so that the light emitted from the light-guiding fiber traverses the tube with scattering;
a cladding surrounding the tube, wherein the tube and the cladding are made of plastic; and
a gap between the tube and the cladding, wherein the gap comprises a gas.

* * * * *